United States Patent [19]

Lee et al.

[11] Patent Number: 4,699,630
[45] Date of Patent: Oct. 13, 1987

[54] FUEL VALVE FOR AIR-VAPOR MIXER

[75] Inventors: James R. Lee; Aubrey A. Ballard, both of Hutchinson, Kans.

[73] Assignee: LPF Carburetion, Inc., Hutchinson, Kans.

[21] Appl. No.: 457,740

[22] Filed: Jan. 14, 1983

[51] Int. Cl.$^4$ .......................... F02M 1/10; F02M 7/22
[52] U.S. Cl. ........................................ 48/180.1; 48/184; 123/180 T; 123/578; 261/39.3; 261/50.2
[58] Field of Search .............. 48/180.1, 184; 123/180 T, 527, 529, 578, 180 R; 261/39 R, 50 A; 251/122

[56] References Cited

U.S. PATENT DOCUMENTS

| | | | |
|---|---|---|---|
| 821,081 | 5/1906 | Brennan | 261/49 |
| 1,929,973 | 10/1933 | Daley | 251/122 |
| 3,719,322 | 3/1973 | Gifford | 261/DIG. 38 X |
| 4,360,481 | 11/1982 | Kaufman | 261/39 R |

OTHER PUBLICATIONS

LPF Carburetion, Inc., LPF Carburetor model L/No. L-734900000, parts list.

*Primary Examiner*—Barry S. Richman
*Assistant Examiner*—Joye L. Woodard
*Attorney, Agent, or Firm*—D. A. N. Chase

[57] ABSTRACT

An improved fuel valve for an air-vapor mixer device for the fuel supply system of an internal combustion engine with which it is in thermal contact is disclosed. The valve operates in a fuel metering orifice and is composed of an acetal copolymer resin having a high coefficient of expansion. When the valve is cool, the metering orifice provides a richer mixture of fuel to air for cold starting and idling. As the engine warms up, the fuel valve expands through thermal contact with the engine and as a result of its high coefficient of expansion, decreases the effective size of the orifice to lean the mixture and thereby provide better fuel economy and reduced pollutants. For mid-range control the fuel valve has a section of generally frustoconical configuration provided with circumferential steps that lean out mid-range mixtures for average operating conditions and produce an optimal admixture of fuel and air.

7 Claims, 8 Drawing Figures

FUEL VALVE FOR AIR-VAPOR MIXER

BACKGROUND OF THE INVENTION

This invention relates to air-vapor mixers for internal combustion engines and is particularly directed to an improvement in the fuel valve of the air-vapor mixer wherein a combination action of the material composing the fuel valve and the configuration of the fuel valve itself improves engine performance.

Internal combustion engines fueled by propane, butane, a mixture of propane and butane, or natural gas utilize an air-vapor mixer in their fuel supply system to mix the fuel with air for combustion in the engine. It is advantageous for an internal combustion engine to operate on as lean a mixture as is possible without misfiring, especially at low and intermediate loads, because to do so results in higher fuel efficiency and a minimum output of pollutants such as hydrocarbons and carbon monoxide (CO). However, lean mixtures will not generally burn reliably under some engine conditions such as starting, idling and deceleration. Accordingly, it is desirable to enrich the charge under conditions where misfiring may occur but to lean the charge under other conditions, such as low and intermediate load level operating conditions, so that a nearly stoichiometric relationship of carbon and oxygen is achieved.

In response to this need, the fuel valve of the present invention is composed of an acetal copolymer resin marketed under the trademark Duracon by the Eiko Company in Japan. The simple linear chain structure($-OCH_2-$)$_n$ and the relative shortness of the carbon-oxygen bond impart properties of high crystallinity and relatively high density to acetal resins in the solid state. This material has the qualities of high stiffness, excellent dimensional stability, high tensile and impact strength, good abrasion resistance, and a low coefficient of friction. This combination of mechanical properties makes the Duracon acetal copolymer suitable as a replacement for metals in a variety of applications.

Besides dimensional stability, an important characteristic of Duracon in the fuel valve of the present invention is its high coefficient of linear thermal expansion over that of metals used in the body of the mixer, e.g. aluminum. The fuel valve, therefore, when cool and in its contracted state creates a larger effective size of the metering orifice in which it operates. When richer mixtures are required for cold starting and idling, the fuel valve, being in this contracted state, provides the larger effective orifice and, therefore, the richer mixture. As the internal combustion engine is heated from this cool state the fuel valve increases in size and, due to its high coefficient of expansion relative to the surrounding metal, thereby leans the mixture for operating conditions such as low and intermediate load levels.

The fuel valve is also provided with an incrementally decreasing perimeter that causes the diameter of the valve to vary in a step-by-step fashion along its operating length or axis. This stepped configuration provides close control of the carbon/oxygen relationship over the mid-range of engine operating speeds. Prior art valve cones with uniform conical surfaces unnecessarily enrichened the mixture with the result that the engine developed high power but at the cost of fuel economy.

It is, therefore, an important object of the present invention to provide an improved fuel valve for an air-vapor mixer which expands to lean the mixture when the engine warms up and effectively controls the mixture over the mid-range of operating speeds to achieve an optimal, nearly stoichiometric relationship of carbon and oxygen.

Another important object of this invention is to provide an improved fuel valve for an air-vapor mixer which has a significantly higher coefficient of thermal expansion than the material defining the metering orifice in which the valve operates, thereby decreasing the effective orifice size to lean the mixture as the internal combustion engine increases in temperature after starting.

Still another important object of this invention is to provide an improved fuel valve for an air-vapor mixer which enables a predetermined, optimal admixture of carbon and oxygen to be maintained over the mid-range of engine speeds, thereby increasing efficiency and minimizing exhaust pollutants.

Furthermore, it is an improtant object of this invention to provide a temperature compensating fuel valve as aforesaid which improves fuel economy and reduces exhaust pollutants while retaining high operational performance including richer mixtures for cold starting and idling.

Additionally, an important object of this invention is to provide a fuel valve as aforesaid with optimal mid-range control in which such control is achieved by a stepped valve surface, each step optimizing the carbon-/oxygen admixture for a corresponding engine speed within the mid-range of operation.

DESCRIPTION OF THE PREFERRED EMBODIMENT

Figure 1:
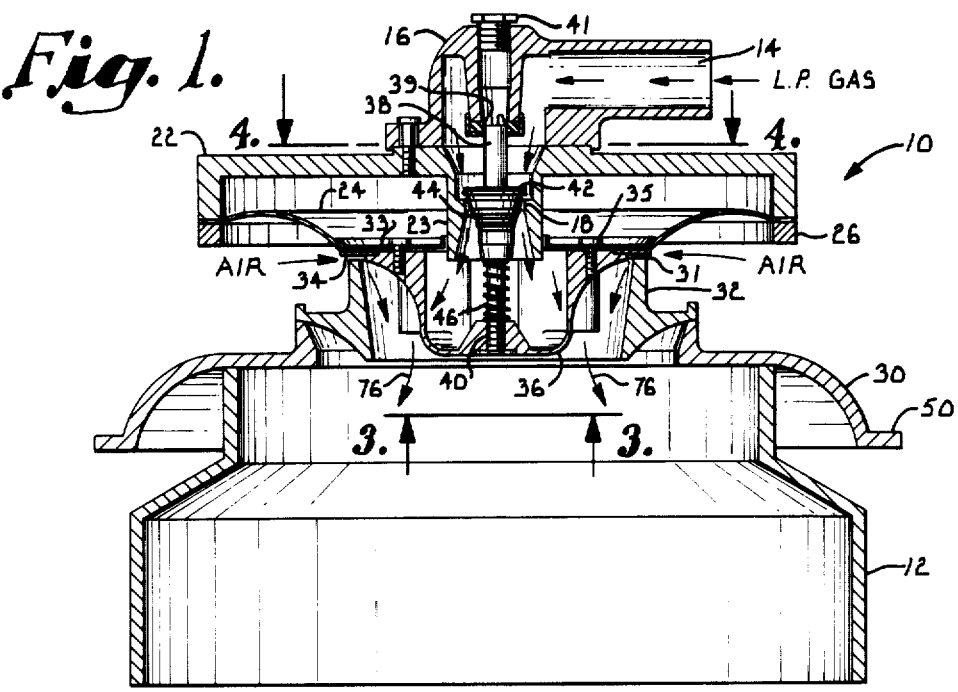
FIG. 1 is a side view of an air-vapor mixer shown in a central, vetical cross-section, the fuel valve of the present invention being illustrated in elevation in an idle position and certain parts being omitted for purposes of clarity.

An air-vapor mixer housing 10 is shown in FIG. 1 secured upon a carburetor 12 which is part of an internal combustion engine (not shown) of an automotive vehicle which the mixer converts from gasoline to liquified gas operation. FIG. 1 illustrates diagrammatically the fuel flow path through the fuel inlet 14 into which the fuel after vaporization travels to elbow 16 and is directed downwardly to a fuel valve metering orifice 18.

Figure 2:
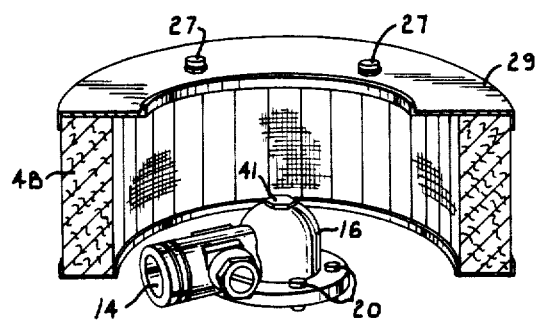
FIG. 2 is an exploded view of the mixer shown in FIG. 1, and also illustrates the air filter and air filter cover.
Figure 2:
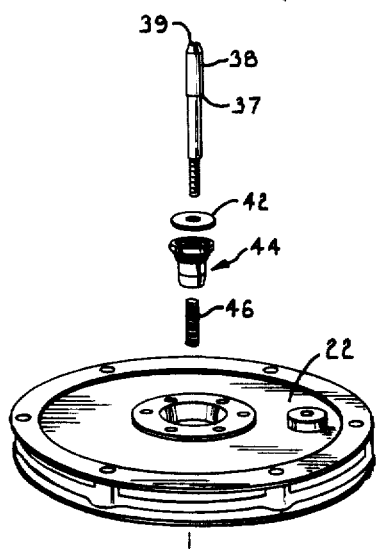
Figure 2:
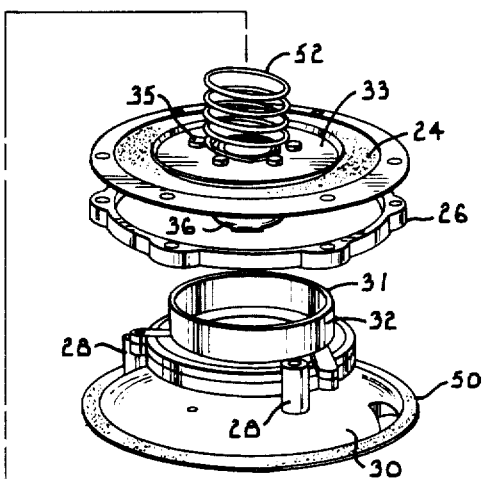

The elbow 16 is secured by fastening means 20, as seen in FIG. 2, to a circular diaphragm assembly cover 22. The diaphragm assembly cover 22 and a diaphragm support ring 26 provide an air tight, a marginal sealing of a diaphragm 24 by means of fastening bolts 27. These fastening bolts 27 pass through the respective holes in an annular air filter cover 29 (shown fragmentarily in FIG. 2), the diaphragm assembly cover 2, the diaphragme 24 and the diaphragm support ring 26 where they are then received into three internally threaded bosses 28 which are integral with the circular mixer base 30. It should be noted that only two threaded bosses 28 can be seen in FIG. 2, as the third boss is hidden from view. The fastening bolts are tightened sufficiently to achieve the airtight sealing of diaphragm 24 between cover 22 and ring 26.

An upstanding, circular neck 32 on base 30 is concentric with the vertical, central axis of the air-vapor mixer housing 10. Neck 32 presents at its top an annular air valve seat 31, as seen best in FIG. 2. Air flow is controlled by an air valve ring 34 carried by diaphragm 24 for movement downwardly and upwardly toward and away from seat 31, the air valve being shown slightly open in FIG. 1 at the idle position. Air flows radially inwardly over air valve seat 31 as illustrated by the "air" arrows when annular air valve ring 34 is raised.

An annular backup plate 33 is secured to an air metering valve 36 with diaphragm 24 and air valve ring 34 sandwiched therebetween. Backup plate 33 is on the upper surface of diaphragm 24 and air metering valve 36 is located beneath air valve ring 34, the latter engaging the lower surface of diaphragm 24. Plate 33, diaphragm 24, ring 34 and valve 36, all concentric with the axis of air-vapor mixer housiing 10, are secured together by means of fasteners 35 which are received in threaded openings in air valve 36.

Figure 3:
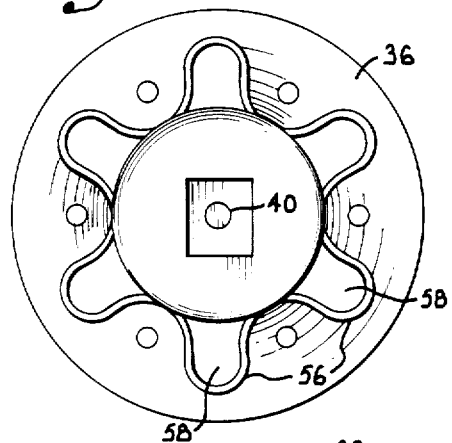
FIG. 3 is an enlarged, fragmentary, bottom view taken along line 3—3 in FIG. 1 to show the air valve of the mixer in detail.
Figure 4:
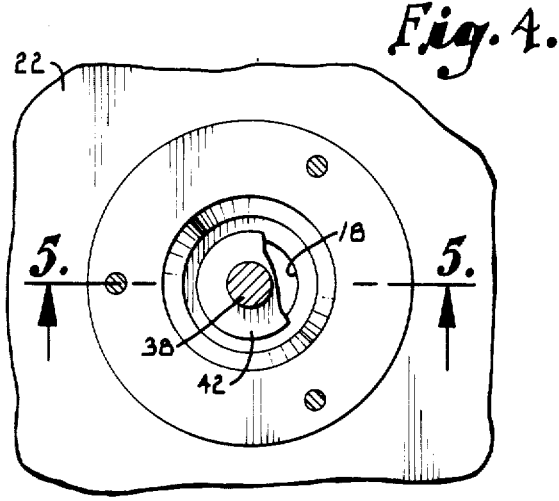
FIG. 4 is an enlarged, fragmentary, horizontal cross section taken along line 4—4 in FIG. 1 and looking downwardly in the direction of the arrows, the elbow of the mixer being removed and a portion ofthe fuel valve being broken away to reveal details of construction.

An idle adjustment screw 38, which moves vertically along the axis of housing 10, is adjustably attached to air metering valve 36 by means of a threaded, axial opening 40 in the bottom of valve 36 as best seen in FIG. 3. The upper end of screw 38 is provided with a kerf 39 which is accessible through elbow 16 by removing a thread cap 41 and inserting a screwdriver tip (not shown). Such uper end portion of screw 38 is of enlarged diameter so as to present an annular shoulder 37 (FIG. 2) against which a washer 42 is securely held by engagement with the top of a fuel valve 44 which is biased upwardly under the action of a spring 46 telescoped over the lower end of screw 38 and engaging the lower end of the fuel valve 44. The lower surface of washer 42 is faced with a gasket material and is somewhat larger in diameter than the fuel valve metering orifice 18. The fuel valve 44 is' a solid Duracon Body, as will be discussed, of generally inverted frustoconical configuration and has an axial bore within which the screw 38 is received. The diaphragm cover 22, and hence the structure presenting the orifice 18, is aluminum.

The air-vapor mixer housing 10 is surrounded at its perimeter by an air filter 48 which rests on a circular ledge 50 presented by the rim of the mixer base 30. Air filter 48 is covered by air filter cover 29, both seen fragmentarily in the exploded view of FIG. 2, and is secured as above discussed so as to provide filtered air for radial flow over air valve seat 31.

FIG. 2 further illustrates air valve spring 52, not shown in FIG. 1, which biases the backup plate 33 downwardly and therefore the diaphragm 24 and air valve ring 34 away from diaphragm assembly cover 22 and towards air valve seat 31 so as to move both fuel valve 44 and air valve ring 34 toward closed positions. It should be noted that cover 22 is provided with an axially disposed barrel 23 (FIG. 5) depending therefrom, and that an annular shoulder in barrel 23 presents the circular fuel metering orifice 18 which opens downstream into a frustoconical passage 54. Spring 52 is telescoped over barrel 23, though not shown in FIG. 1 for clarity of illustration.

Figure 5:
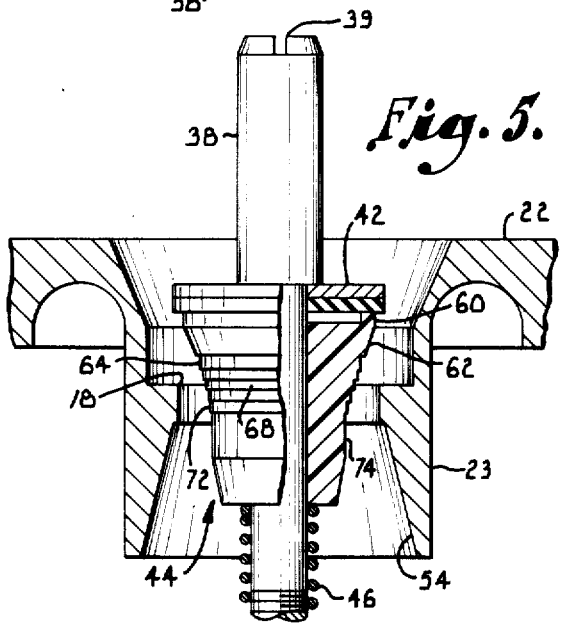
FIG. 5 is a further enlaged, vertical sectional view taken along line 5—5 of FIG. 4, the fuel valve being raised to a mid-range position and a portion of the fuel valve being shown in elevation for clarity.
Figure 8:
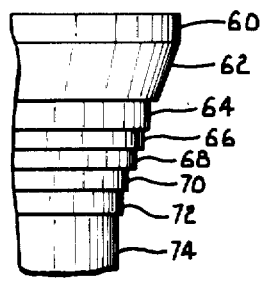
FIG. 8. is a further enlaged, fragmentary view of the fuel valve as seen in FIG. 5.

The fuel valve 44 is shown in detail in FIGS. 5 and 8. The valve is entirely symmetrical about its vertical axis and is coaxial with the idle adjustment screw 38. The outer surface of the upper end of valve 44 presents a narrow, cylindrical band 60 which merges with an axially tapered, idle range control section 62 thta presents a frustum of an inverted cone. A mid-range control section begins just beneath the idle range control section 62, and comprises five concentric, circumferential steps 64, 66, 68, 70 and 72 respectively, It maybe appreciated from FIG. 5 that this mid-range section is also of generally frustoconical (inverted) configuration, but that the section actually comprises the series of circumferential steps which incrementally decrease in diameter from the uppermost step 64 to the lowermost step 72. A final section 74 beneath the step 72 presents the lower end portion of the valve 44 and is the portion of the valve that is effective during high-speed operation of the engine. The section 74 is initially a cylindrical surface and then merges with a frustoconical lower tip as is evident in the drawings.

Each of the mid-range steps 64–72 is sized to provide an optimal relationship of carbon and oxygen in the admixture of fuel and air in the discharge passage defined by the region adjacent to and underlying the air valve 36 as represented by the lowermost arrows 76 (FIG. 1). Such admixture is also enhanced by the steps due to turbulence induced in the gas as it flows over the irregular stepped surface thus presented by the fuel valve 44.

Figure 6:
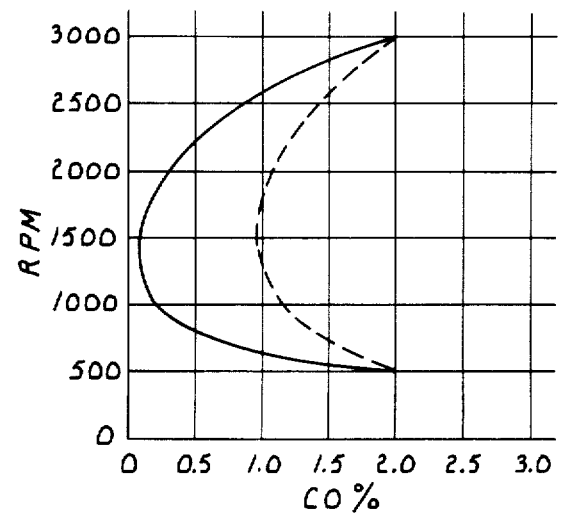
FIG. 6. is a graph showing the relationship of the speed of an internal combusion engine to the percentage of carbon monoxide in the exhaust for the fuel valve of the present invention, shown by a solid line, and a prior art aluminum fuel valve, shown by a broken line.

Referring to FIG. 6, a representative graph is shown illustrating the improved midrange performance of the present invention as compared with a prior art aluminum fuel valve employing a uniform conical surface. For optimum economy and performance, the carbon monoxide content of the exhaust should be approximately two percent at idle and full load and between approximately 0.2 percent and 1 percent over the midrange engine speeds. As the solid line of FIG. 6 indicates, this is achieved in the present invention due to the employment of the mid-range steps 64–72 which lean the mixture to a nearly stoichiometric relationship of carbon and oxygen. It should be understood that if the mixture were precisely stoichiometric the hydrocarbon content in the exhaust would be undesirably high, thus the steps of the mid-range section of the valve 44 are sized tao provide a mixture that is slightly richer than stoichiometric. The data presentd by FIG. 6 was obtained from an Allen infrared gas analyzer in tests on a 534 cubic inch displacement (CID) Ford V-8 engine conducted on a stationary Kahn dynamometer.

By way of an example, the following dimensions are appropriate for the valve 44 in a mixer having a metering orifice diameter (orifice 18) of 0.642 inch, installed on a 534 CID Ford V-8 engine:

| Portion of valve 44 | rpm at beginning of step (100 ft-lbs load) | diameter (in.) at room temp. |
|---|---|---|
| band 60 | — | .608 |
| step 64 | 1050 | .540 |
| step 66 | 1850 | .515 |
| step 68 | 2250 | .500 |
| step 70 | 2550 | .482 |
| step 72 | 2850 | .470 |
| section 74 (cyl.) | — | .435 |

OPERATION

When the engine is not running, the lower surface of washer 42 at its circumferential margin is seated on the annular shoulder defining the circular fuel metering orifice 18. As is conventional, when the engine starts the intake manifold vacuum is communicated by the narrow annular space around the barrel 23 to the top side of the diaphragm 24 and, therefore, the chamber formed by such diaphragm and the undersurface of cover 22. This raises the fuel valve 44 and the air valve 36 vertically along the valve axis in accordance with the throttle setting, an idle position being illustrated in FIG. 1. Upon initial startup the Duracon body of the fuel valve 44 is cold and hence relatively contracted to provide a richer mixture. As the engine warms up the housing 10 of the mixer likewise increases in temperature along with the various components of the mixer including the fuel valve 44. Heat transfer to the mixer from the engine is both by conduction and by radiation as the heat rises from the engine block.

Figure 7:
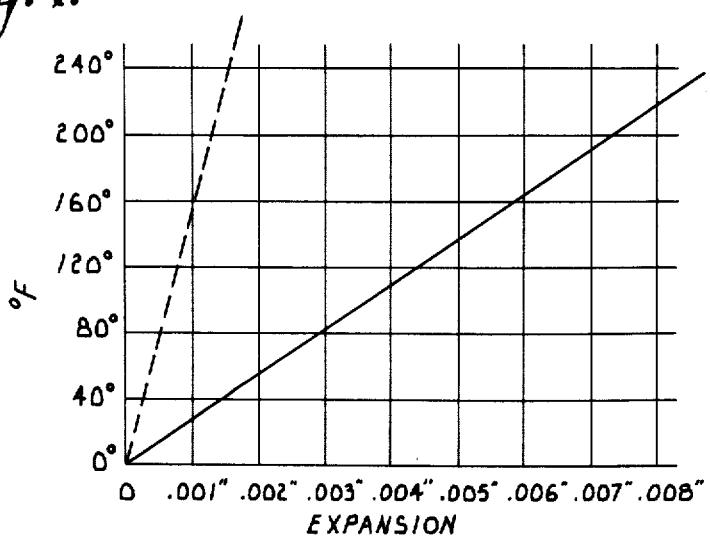
FIG. 7 is a graph showing the expansion rate of the Duracon fuel valve, illustrated by a solid line, and a prior art aluminum fuel valve, shown by a broken line.

It may be appreciated, therefore, that the Duracon body begins to expand as the engine develops heat and that, therefore, the annular space between the control section 62 of the valve 44 and the circular edge of the orifice 18 decreases to lean the mixture. FIG. 7 shows that the expansion rate of the Duracon fuel valve body (solid line) is on the order of 5 or 6 times greater than the expansion rate of an aluminum fuel valve (broken line). The ordinate of the graph is in degrees Fahrenheit, and the abscissa represents the expansion in thousanths of an inch of the diameter of the fuel valve measured at its maximum diameter (band 60). In FIG. 7 the maximum diameter of the valve is 0.608 inch at room temperature, and the expansion rate of the Duracon valve is approximately 5.8 times greater than the aluminum valve. The result is that the orifice 18 is closed (effective annular cross-sectional area reduced) by approximately 10 percent as the engine warms up.

The idle speed of the engine is adjusted in the usual manner by the idle adjustement screw 38. It should be understood that the fuel valve 44 and the air valve 36 move in unison along the common axis of the adjustment screw 38, fuel valve 44 and housing 10 in response to movement of the diaphragm 24 due to the threaded connection of the lower end of screw 38 to the air valve 36.

As may be seen by a comparison of FIGS. 1 and 3, the air valve 36 is of cup shaped configuration and is provided with six vertically extending flutes 56 regularly spaced about its axis, each of the flutes defining a vertical channel 58 therein through which the vaporous fuel passes downstream from the orifice 18. As illustrated y the two arrows 76 (FIG. 1) the discharge passage beneath these flutes 56 is where the fuel and air admix and then flow on downwardly into the throat of the carburetor 12.

Demand for engine speed raises the fuel valve 44, a representative mid-range position being illustrated in FIG. 5. In such position the fuel is metered by the circumferential step 68 which, in FIG. 5, is directly opposing the upper edge of the orifice 18. Furhter throttle increases successively bring the steps 70 and 72 into ooperation and, finally, still further upward displacement raises the fuel 44 to a disposition (not shown) where the final section 74 is in operation.

It should be understood that the number of steps in the mid-range control section of the fuel valve required to achieve full range metering, and the vetical length of each of these steps, will vary depending upon the particular engine with which the mixer is to be used and the load for which the valve is to be optimized. Once such load is selected, such as one hundred foot-pounds of torque as in the table set forth above to approximate average driving at cruising speeds, the vertical length of each step is determined by monitoring the hydrocarbon and carbon monoxide content of the exhaust until the leanest permissible mixture is obtained, at which point higher engine speeds require a richer mixture afforded by the next step of the section. The employment of these steps for mid-range control and the use of the Duracon resin enables the fuel valve of the present invention to be injection molded to precise dimensions. Accordingly, the dimensions of the steps necessary to obtain the desired optimal fuel mixtures may be accurately and consistently reproduced.

Having thus described the invention, what is claimed as new and desired to be secured by Letters Patent is:

1. An air-fuel mixer device for the fuel supply system of an internal combustion engine with which it is in thermal contact, said device comprising:
   a housing having a mixture discharge passage,
   a fuel inlet terminating inside said housing at structure defining a fuel valve metering orifice upstream from said discharge passage,
   a fuel valve of generally frustoconical configuration in said metering orifice cooperating therewith to control fuel flow to said discharge passage,
   an air valve in said housing upstream from said discharge passage for controlling air flow thereto for admixture with the fuel,
   means interconnecting said fuel and air valves for movement in unison axially of the fuel valve in one direction to increase the flow of fuel and air to said discharge passage, and in the opposite direction to decrease said flow,
   said fuel valve having an idle speed control section of greatest diameter, an axially tapered mid-range control section of lesser diameter provided with a number of peripheral steps which, in said opposite direction, incrementally decrease in diameter, and a final section of further reduced diameter for controlling high-speed operation of the engine,
   said number of steps of said mid-range control section corresponding to a like number of successive ranges of engine speed between idle and high-speed operation of the engine, each of said steps having a diameter that cooperates with said orifice to define an effective orifice size which causes a predetermined, optimal admixture of fuel and air over the corresponding speed range and the leanest permissible admixture at the highest engine speed of that range, and said fuel valve being composed of a material having a high coefficient of expansion relative to said orifice-defining structure so as to increase said effective size of the orifice at cool temperatures, thereby enriching the mixture, and decrease said effective size when the mixer device is heated and the fuel valve expands, thereby leaning the mixture.

2. The device as claimed in claim 1, wherein said orifice-defining structure is metallic and said fuel valve is composed of a high molecular weight, demensionally stable polymeric resin.

3. The device as claimed in claim 2, wherein said resinous fuel valve is on the order of five or six times more expansive than aluminum in response to increases in temperature.

4. The device as claimed in claim 2, wherein said fuel valve is composed of an acetal copolymer resin.

5. The device as claimed in claim 1, further comprising means for adjustably shifting said fuel valve along said axis to set said idle speed control section at a preselected position relative to said orifice, whereby to set the idle mixture of the engine.

6. The device as claimed in claim 5, wherein said material is characterized by the property of expanding said idle speed control section as the engine wrms up to decrease said effective size of the orifice by approximately 10 percent.

7. The device as claimed in claim 1, wherein said mid-range control section has a generally frustoconical configuration and is aligned with said axis, and wherein said peripheral steps extend circumferentially of said mid-range control section and are concentric with one another and with said orifice.

* * * * *

UNITED STATES PATENT AND TRADEMARK OFFICE
CERTIFICATE OF CORRECTION

PATENT NO. : 4,699,630
DATED : October 13, 1987
INVENTOR(S) : James R. Lee et al It is certified that error appears in the above-identified patent and that said Letters Patent is hereby corrected as shown below:

Column 3, line 41, "housiing" should read -- housing --.

Column 4, line 22, "thta" should read -- that --.

Column 4, line 64, "tao" should read -- to --.

Column 7, line 14, "demensionally" should read -- dimensionally --.

Column 8, line 10, "wrms" should read -- warms --.

Signed and Sealed this

Fifth Day of July, 1988

*Attest:*

DONALD J. QUIGG

*Attesting Officer*  *Commissioner of Patents and Trademarks*